United States Patent
Meng et al.

(10) Patent No.: US 11,438,029 B2
(45) Date of Patent: Sep. 6, 2022

(54) SCREEN TRANSMISSION METHOD, VEHICLE MOUNT, AND STORAGE MEDIUM

(71) Applicant: GOERTEK INC., Shandong (CN)

(72) Inventors: Senxiang Meng, Shandong (CN); Zhiwei Wang, Shandong (CN); Ke Dong, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 17/279,229

(22) PCT Filed: Dec. 27, 2018

(86) PCT No.: PCT/CN2018/124345
§ 371 (c)(1),
(2) Date: Mar. 24, 2021

(87) PCT Pub. No.: WO2020/062678
PCT Pub. Date: Apr. 2, 2020

(65) Prior Publication Data
US 2021/0409071 A1    Dec. 30, 2021

(30) Foreign Application Priority Data
Sep. 28, 2018  (CN) .......................... 201811141445.6

(51) Int. Cl.
*H04B 5/00*    (2006.01)
*H04M 1/10*    (2006.01)
*H04M 1/725*   (2021.01)

(52) U.S. Cl.
CPC ............ *H04B 5/0031* (2013.01); *H04M 1/10* (2013.01); *H04M 1/725* (2013.01)

(58) Field of Classification Search
CPC .. B60K 35/00; B60K 37/06; B60K 2370/589; B60K 2370/52; B60K 2370/1438;
(Continued)

(56) References Cited

U.S. PATENT DOCUMENTS

| | | |
|---|---|---|
| 2009/0143098 A1 | 6/2009 | Shiono |
| 2015/0120088 A1 | 4/2015 | Park |
| 2016/0097651 A1* | 4/2016 | Jung .................... G08G 1/0969 701/428 |
| 2017/0208637 A1 | 7/2017 | Chen et al. |
| 2019/0272182 A1* | 9/2019 | Wang .................... G01R 33/00 |

FOREIGN PATENT DOCUMENTS

| | | |
|---|---|---|
| CN | 104918006 | 9/2015 |
| CN | 105094732 | 11/2015 |

(Continued)

OTHER PUBLICATIONS

CN Office Action issued in 201811141445.6 dated Jan. 10, 2020.
International Search Report cited in PCT/CN2018/124345 dated Jul. 3, 2019.

*Primary Examiner* — Golam Sorowar
(74) *Attorney, Agent, or Firm* — Workman Nydegger

(57) ABSTRACT

A screen delivery method, a vehicle bracket and a storage medium are provided. In the method, at least one mobile terminal around the vehicle bracket is detected; a target mobile terminal is determined from the at least one mobile terminal based on a change in intensity of a magnetic field between the at least one mobile terminal and the vehicle bracket; and screen delivery is performed between the vehicle bracket and the target mobile terminal based on a communicational connection between the vehicle bracket and the target mobile terminal in a case that it is determined that the target mobile terminal is fixed on the vehicle bracket. Therefore, with the method, the user's different application requirements for the vehicle bracket are met, and the user experience is improved.

12 Claims, 3 Drawing Sheets

(58) Field of Classification Search
CPC ........ B60K 2370/573; B60K 2370/566; B60K 2370/563; B60K 2370/11; B60K 2370/148; B60K 2370/1868; B60K 2370/55; B60K 2370/182; B60K 2370/186; B60K 2370/152; B60K 2370/1529; B60K 2370/175; B60K 2370/334; B60K 2370/583; B60K 2370/5899; G06F 3/0488; G06F 3/0482; G06F 3/013; G06F 3/1454; G06F 3/04817; G06F 3/1423; G06F 3/167; G06F 3/0416; G06F 2203/04101; G06F 3/033; G06F 3/044; G06F 9/452; G06F 3/0486; G06F 3/04886; G06F 1/163; G06F 2203/04806; H04L 67/12; H04L 67/10; H04L 67/306; H04L 51/02; H04L 51/10; H04L 63/105; H04L 12/2812; H04L 12/282; H04L 2012/2841; H04L 2012/2849; H04L 67/16
See application file for complete search history.

(56) References Cited

FOREIGN PATENT DOCUMENTS

| | | |
|---|---|---|
| CN | 105278973 | 1/2016 |
| CN | 105792004 | 7/2016 |
| CN | 107493375 | 12/2017 |
| CN | 108024131 | 5/2018 |
| CN | 108337667 | 7/2018 |
| CN | 109040394 | 12/2018 |

* cited by examiner

US 11,438,029 B2

SCREEN TRANSMISSION METHOD, VEHICLE MOUNT, AND STORAGE MEDIUM

The present application is the national phase of International Patent Application No. PCT/CN2018/124345, titled "SCREEN TRANSMISSION METHOD, VEHICLE MOUNT, AND STORAGE MEDIUM", filed on Dec. 27, 2018, which claims priority to Chinese Patent Application No. 201811141445.6, titled "SCREEN TRANSMISSION METHOD, VEHICLE MOUNT, AND STORAGE MEDIUM", filed on Sep. 28, 2018 with the Chinese Patent Office, both of which are incorporated herein by reference in their entireties.

FIELD

The present disclosure relates to the technical field of vehicle devices, and in particular to a screen delivery method, a vehicle bracket and a storage medium.

BACKGROUND

At present, vehicle brackets are installed on vehicles such as cars, taxis, and buses. The user's mobile terminal, such as a mobile phone and a tablet computer may be fixed by the vehicle bracket. In addition to fixing the mobile terminal, some vehicle brackets may provide functions such as charging for the mobile terminal.

With the increasing demands of the users, the requirements for the vehicle brackets are increased. However, the conventional vehicle bracket can only provide limited functions, which cannot meet the increasing demands of the users.

SUMMARY

According to multiple aspects of the present disclosure, a screen delivery method, a vehicle bracket and a storage medium are provided to meet the increasing demands of the users and improve user experience.

A screen delivery method is provided according to an embodiment of the present disclosure. The method is applied to a vehicle bracket, and the method includes:

detecting at least one mobile terminal around the vehicle bracket;

determining a target mobile terminal from the at least one mobile terminal based on a change in intensity of a magnetic field between the at least one mobile terminal and the vehicle bracket; and performing screen delivery between the vehicle bracket and the target mobile terminal based on a communicational connection between the vehicle bracket and the target mobile terminal in a case that it is determined that the target mobile terminal is fixed on the vehicle bracket.

A vehicle bracket is further provided according to an embodiment of the present disclosure. The vehicle bracket includes a bracket body. The bracket body is magnetic, and the bracket body is arranged with a magnetic field sensor, a screen and a processor.

The processor is configured to: detect at least one mobile terminal around the vehicle bracket; determine a target mobile terminal from the at least one mobile terminal based on a change in intensity of a magnetic field between the at least one mobile terminal and the vehicle bracket detected by the magnetic field sensor; and perform screen delivery between the vehicle bracket and the target mobile terminal based on the communication connection between the vehicle bracket and the target mobile terminal in a case that it is determined that the target mobile terminal is fixed on the vehicle bracket.

The magnetic field sensor is configured to detect the change in the intensity of the magnetic field between the at least one mobile terminal and the vehicle bracket.

A readable storage medium storing a computer program is further provided according to an embodiment of the present disclosure. The computer program, when executed, performs the screen delivery method.

A screen delivery method is provided according to an embodiment of the present disclosure. The method is applied to a vehicle bracket, and the method includes:

detecting at least one mobile terminal around the vehicle bracket;

determining a target mobile terminal from the at least one mobile terminal based on a change in a distance between the at least one mobile terminal and the vehicle bracket; and performing, in a case that an electric signal sent by the target mobile terminal is received, screen delivery between the vehicle bracket and the target mobile terminal based on a communicational connection between the vehicle bracket and the target mobile terminal. The electric signal is sent in a case that a magnetic field sensor in the target mobile terminal detects that intensity of a magnetic field around the target mobile terminal exceeds a predetermined magnetic field intensity threshold.

A vehicle bracket is provided according to an embodiment of the present disclosure. The vehicle bracket includes a bracket body. The bracket body is arranged with a magnet, a distance sensor, a screen and a processor.

The processor is configured to: detect at least one mobile terminal around the vehicle bracket; determine a target mobile terminal from the at least one mobile terminal based on a change in a distance between the at least one mobile terminal and the vehicle bracket detected by the distance sensor; and perform, in a case that an electric signal sent by the target mobile terminal is received, screen delivery between the vehicle bracket and the target mobile terminal based on a communicational connection between the vehicle bracket and the target mobile terminal. The electric signal is sent in a case that a magnetic field sensor in the target mobile terminal detects that intensity of a magnetic field around the target mobile terminal exceeds a predetermined magnetic field intensity threshold.

In the embodiments of the present disclosure, at least one mobile terminal around the vehicle bracket is detected; a target mobile terminal is determined from the at least one mobile terminal based on a change in intensity of a magnetic field between the at least one mobile terminal and the vehicle bracket; and screen delivery is performed between the vehicle bracket and the target mobile terminal based on a communicational connection between the vehicle bracket and the target mobile terminal in a case that it is determined that the target mobile terminal is fixed on the vehicle bracket. With the embodiments of the present disclosure, the information displayed on the screen of the vehicle bracket and the information displayed on the screen of the target mobile terminal can be transferred between the vehicle bracket and the target mobile terminal in different application scenarios, meeting the user's different application requirements for the vehicle bracket and improving user experience.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

Hereinafter, the technical solutions according to the embodiments of the present disclosure are described in conjunction with the drawings in the embodiments of the present disclosure. Apparently, the described embodiments are only a few rather than all of the embodiments according to the present disclosure. Any other embodiments obtained by those skilled in the art based on the embodiments according to the present disclosure without any creative work fall in the scope of the present disclosure.

For the technical problem that the conventional bracket cannot meet the user's increasing demand for display, a solution is provided according to the embodiments of the present disclosure. According to the solution, at least one mobile terminal around the vehicle bracket is detected; a target mobile terminal is determined from the at least one mobile terminal based on the proximity of the at least one mobile terminal to the vehicle bracket; and screen delivery is performed between the vehicle bracket and the target mobile terminal based on a communicational connection between the vehicle bracket and the target mobile terminal. With the embodiments of the present disclosure, the information displayed on the screen of the vehicle bracket and the information displayed on the screen of the target mobile terminal can be transferred between the vehicle bracket and the target mobile terminal in different application scenarios, meeting the user's different application requirements for the vehicle bracket and improving user experience.

The technical solutions according to the embodiments of the present disclosure are described in detail below in conjunction with the drawings.

Figure 1A:
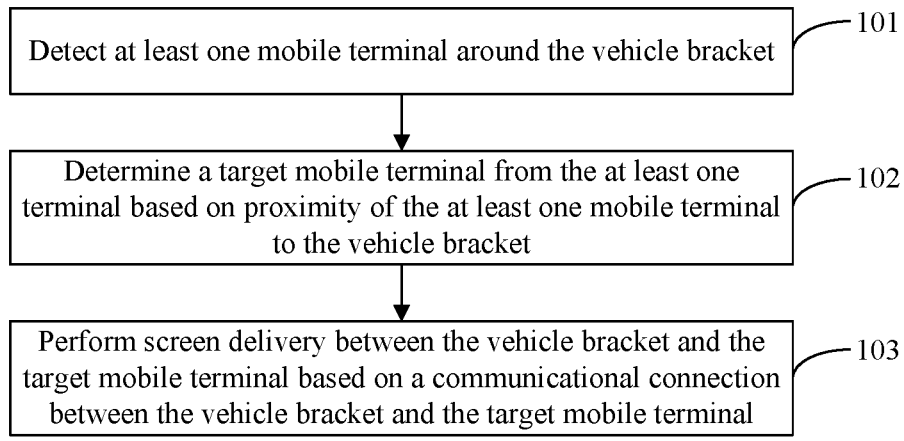
FIG. 1a is a flow chart of a screen delivery method according to an embodiment of the present disclosure.

FIG. 1a is a flow chart of a screen delivery method according to an embodiment of the present disclosure. The method is applied to a vehicle bracket. As shown in FIG. 1a, the method includes the following steps 101 to 103.

In step 101, at least one mobile terminal around the vehicle bracket is detected.

In step 102, a target mobile terminal is determined from the at least one terminal based on proximity of the at least one mobile terminal to the vehicle bracket.

In step 103, screen delivery is performed between the vehicle bracket and the target mobile terminal based on a communicational connection between the vehicle bracket and the target mobile terminal.

In the embodiment, the vehicle bracket is a vehicle device for the user to fix a mobile terminal while driving. Generally, the vehicle bracket is placed at a suitable position in the vehicle where the mobile terminal can be fixed in the vehicle bracket easily or the user can operate the vehicle bracket easily. Convenience and safety are basic requirements. The user may be a driver, or a person sitting in the front passenger seat, or a person sitting in another seat. In the embodiment, how the mobile terminal is fixed on the vehicle bracket is not limited. For example, the mobile terminal may be fixed on the vehicle bracket by using a buckle, a clip or a suction cup, or the mobile terminal may be attracted on the vehicle bracket by using a magnet. The mobile terminal may be, but is not limited to, a smartphone, a tablet computer, and a palmtop computer.

In the embodiment, in addition to fixing the mobile terminal, the vehicle bracket is arranged with a screen. The vehicle bracket may display some content, such as a map, a real-time traffic condition, time and a vehicle speed on the screen. In practices, in order to facilitate the user to view content, it is required to perform screen delivery between the vehicle bracket and the mobile terminal. For example, in a case that the size of the screen of the vehicle bracket is small, the content displayed on the screen of the vehicle bracket may be transferred to the screen of the mobile terminal for display to enable the user to clearly view the content. In a case that the remaining power of the mobile terminal is insufficient, in order to save power of the mobile terminal, the content displayed on the screen of the mobile terminal may be transferred to the screen of the vehicle bracket for display, and the mobile terminal enters into a dormant state to save power.

In the embodiment, the process of performing screen delivery between the vehicle bracket and the mobile terminal includes: detecting, by the vehicle bracket, at least one mobile terminal around the vehicle bracket. Depending on the vehicle where the vehicle bracket is located, there may be one mobile terminal or multiple mobile terminals around the vehicle bracket. For example, for a private car, in a case that a driver is driving alone, there may be only a mobile terminal of the driver around the vehicle bracket. For another example, for a public transportation vehicle or a bus, there may be multiple mobile terminals around the vehicle bracket. The multiple mobile terminals include the mobile terminal of the driver and mobile terminals of the passengers.

It should be noted that in a case that at least one mobile terminal around the vehicle bracket is detected, it does not mean that the vehicle bracket must perform screen delivery with one or more of the at least one mobile terminal. Only in a case that a mobile terminal around the vehicle bracket needs to perform screen delivery with the vehicle bracket, the vehicle bracket performs screen delivery with the mobile terminal. Generally, the mobile terminal that needs to perform screen delivery with the vehicle bracket is required to be fixed on the vehicle bracket. During being fixed on the vehicle bracket, the mobile terminal that needs to perform screen delivery with the vehicle bracket gradually approaches the vehicle bracket.

Therefore, in step 102, a target mobile terminal may be determined from the at least one mobile terminal based on proximity of the least one mobile terminal to the vehicle bracket. The target mobile terminal is a mobile terminal that is around the vehicle bracket and needs to perform screen delivery with the vehicle bracket. For example, in a case that a driver is driving a vehicle, in order to view the real-time road conditions more clearly, the mobile terminal having a relatively large screen may be fixed on the vehicle bracket, and the real-time road conditions displayed on the screen of the vehicle bracket may be transferred to the screen of the mobile terminal for display. In this case, the target mobile terminal is the mobile terminal of the driver. After the target mobile terminal is determined, screen delivery may be performed between the vehicle bracket and the target mobile terminal based on the communicational connection between the vehicle bracket and the target mobile terminal.

In the embodiment, the vehicle bracket may establish a communicational connection with a target mobile terminal after determining the target mobile terminal from the at least one mobile terminal, or the vehicle bracket may establish a communicational connection with the target mobile terminal in advance before step 102. In an embodiment, the vehicle bracket may detect at least one mobile terminal around the vehicle bracket and establish a communicational connection with the at least one mobile terminal around the vehicle bracket in step 101.

In the embodiment, at least one mobile terminal around the vehicle bracket is detected; a target mobile terminal is determined from the at least one mobile terminal based on the proximity of the at least one mobile terminal to the vehicle bracket; and screen delivery is performed between the vehicle bracket and the target mobile terminal based on a communicational connection between the vehicle bracket and the target mobile terminal. With the embodiment, the information displayed on the screen of the vehicle bracket and the information displayed on the screen of the target mobile terminal can be transferred between the vehicle bracket and the target mobile terminal in different application scenarios, meeting the user's different application requirements for the vehicle bracket and improving user experience.

In the embodiments of the present disclosure, the vehicle bracket is wirelessly connected to the mobile terminal. In the embodiment, in a case that the vehicle bracket is in a communicational connection with the mobile terminal via a mobile network, the network standard of the mobile network may be any of 2G (GSM), 2.5G (GPRS), 3G (WCDMA, or TD-SCDMA, or CDMA2000, or UTMS), 4G (LTE), 4G+ (LTE+) and WiMax. In addition, the vehicle bracket may be in a communicational connection with the mobile terminal via a connection mode such as Bluetooth, WiFi, and infrared.

For different communication modes, the effective distance ranges are different. That is, the different communication modes supported by the vehicle bracket indicate that the effective distance ranges for the vehicle bracket to establish a communicational connection with the mobile terminal are different. Thus, in an embodiment, the step 101 may be performed by: detecting, within an effective distance range for a communication mode supported by the vehicle bracket, at least one mobile terminal that enables the communication mode. For example, in a case that the vehicle bracket supports a Bluetooth communication mode, the effective distance range for the Bluetooth communication mode is less than or equal to 10 m, that is, only the mobile terminal that is less than or equal to 10 m in distance from the vehicle bracket can establish a Bluetooth connection with the vehicle bracket. Therefore, in step 101, at least one mobile terminal that enables the Bluetooth communication mode may be detected within a range less than or equal to 10 m supported by the Bluetooth communication mode. In an embodiment, after the at least one mobile terminal that enables the Bluetooth communication mode is detected, a Bluetooth communication connection may be established with the detected mobile terminal.

It should be noted that in the embodiments of the present disclosure, since the vehicle bracket is required to provide the user with the function of fixing the mobile terminal, in an application scenario in which the user fixes the mobile terminal on the vehicle bracket, the target mobile terminal may be determined based on the proximity of the at least one mobile terminal to the vehicle bracket as described in step 102. However, in some application scenarios, the target mobile terminal may be determined in other ways.

For example, in a taxi application scenario, the driver is the same or several persons, and the passengers are different and not the same one. Generally, there are records about communication connections between the mobile terminal of the taxi driver and the vehicle bracket, and there are no records about the communication connections between the mobile terminals of the passengers and the vehicle bracket. Therefore, after the at least one mobile terminal around the vehicle bracket is detected, the operations according to the following embodiments may be performed before step 102.

In a first embodiment, based on the historical connection records of the vehicle bracket, a historical connection record of the vehicle bracket with a mobile terminal in the at least one mobile terminal is searched from the historical connection records of the vehicle bracket. If the historical connection record of the vehicle bracket with a mobile terminal in the at least one mobile terminal is found, a target mobile terminal is determined from the mobile terminals that have a historical connection record. Furthermore, target mobile terminal may be determined, based on proximities of the vehicle bracket and the mobile terminals that have a historical connection record, from the mobile terminals that have a historical connection record. If the historical connection record of the vehicle bracket with a mobile terminal in the at least one mobile terminal is not found, proceed to step 102.

In an embodiment, if the historical connection records of the vehicle bracket only include a historical connection record of the vehicle bracket with one mobile terminal, a mobile terminal storing a historical connection record in the at least one mobile terminal is determined as the target mobile terminal. If the number of the mobile terminal having a historical connection record in the at least one mobile terminal is greater than or equal to two, proceed to step 102 in which the target mobile terminal is determined from the mobile terminal having a historical connection record based on proximity of the vehicle bracket to the mobile terminal having a historical connection records.

In a second embodiment, based on historical connection records of the vehicle bracket, a frequency or times that the at least one mobile terminal establishes a connection with the vehicle bracket is calculated, and the mobile terminal having a highest connection establishment frequency or most connection establishment times in the at least one mobile terminal is determined as the target mobile terminal. In an embodiment, if the number of the mobile terminal having the highest connection establishment frequency or the most connection establishment times in the at least one mobile terminal is greater than or equal to two, proceed to step 102 in which the target mobile terminal is determined from the mobile terminals having the highest connection establishment frequency or the most connection establishment times based on proximity of the vehicle bracket to the mobile terminal having the highest connection establishment frequency or the most connection establishment times.

While driving the vehicle, the driver may fix the mobile phone on the vehicle bracket to operate and check the mobile phone easily, and it is convenient for the driver to pick up the mobile phone. Thus, the vehicle bracket generally performs screen delivery with the mobile terminal placed on the vehicle bracket, that is, the mobile terminal placed on the vehicle bracket is the target mobile terminal. During being fixed on the vehicle bracket, the target mobile terminal gradually approaches the vehicle bracket. Therefore, a proximity sensor may be arranged on the vehicle bracket to detect whether there is a mobile terminal gradually approaching the vehicle bracket. The proximity sensor may be configured as, but not limited to, a distance sensor to detect the distance between the mobile terminal and the vehicle bracket, or a magnetic field sensor to detect whether the intensity of the magnetic field between the mobile terminal and the vehicle bracket is gradually increasing to determine whether the mobile terminal is gradually approaching the vehicle bracket.

In a case that the proximity sensor is configured as a distance sensor, in an embodiment, the step 102 may be performed by: detecting, based on a change in a distance between the at least one mobile terminal and the vehicle bracket, whether there is a mobile terminal gradually approaching the vehicle bracket in the at least one mobile terminal; and selecting, if there is a mobile terminal gradually approaching the vehicle bracket in the at least one mobile terminal, a mobile terminal having a distance from the vehicle bracket decreased to be within a predetermined distance threshold range from the mobile terminal gradually approaching the vehicle bracket as the target mobile terminal.

In some application scenarios, the vehicle bracket is magnetic. For example, the vehicle bracket may be arranged with a magnet. The vehicle bracket having a magnet may be called as a magnetic vehicle bracket. Corresponding to the magnetic vehicle bracket, the mobile terminal may be magnetic. For example, the mobile terminal may be arranged with a magnet having magnetism opposite to the magnetism of the vehicle bracket. In addition, the vehicle bracket is further arranged with a magnetic field sensor. The magnetic field sensor may detect a change in a magnetic field between the vehicle bracket and the mobile terminal around the vehicle bracket. In a case that a mobile terminal needs to perform screen delivery with the vehicle bracket, the mobile terminal is required to gradually approach the vehicle bracket and finally be fixed on the vehicle bracket. In this case, the intensity of the magnetic field between the mobile terminal and the vehicle bracket changes and the change is detected by the magnetic field sensor. For example, the intensity of the magnetic field between the mobile terminal and the vehicle bracket increases as the mobile terminal approaches the vehicle bracket. The intensity of the magnetic field between the mobile terminal and the vehicle bracket reaches a maximum value when the mobile terminal is fixed on the vehicle bracket.

In an embodiment, the magnetic field sensor arranged on the vehicle bracket may be a Hall sensor. In a case that a Hall sensor is adopted, it is unnecessary to additionally arrange a magnet on the vehicle bracket since the Hall sensor includes a magnet.

Figure 1B:
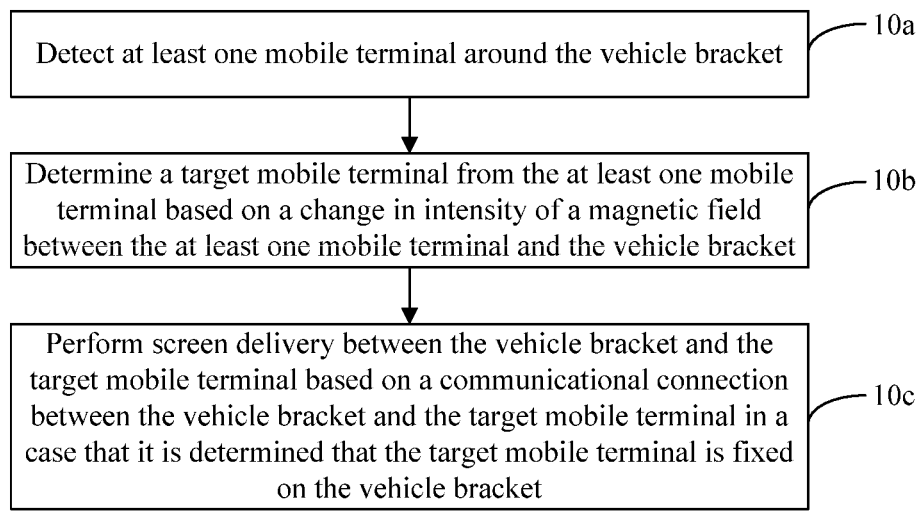
FIG. 1b is a flow chart of a screen delivery method according to another embodiment of the present disclosure.

In the above application scenarios, the proximity of the mobile terminal to the vehicle bracket may be reflected by the change in the intensity of the magnetic field between the mobile terminal and the vehicle bracket. Thus, a screen delivery method, applied to a magnetic vehicle bracket, is provided according to an embodiment of the present disclosure. As shown in FIG. 1b, the method includes the following steps 10a to 10c.

In step 10a, at least one mobile terminal around the vehicle bracket is detected.

In step 10b, a target mobile terminal is determined from the at least one mobile terminal based on a change in intensity of a magnetic field between the at least one mobile terminal and the vehicle bracket.

In step 10c, screen delivery is performed between the vehicle bracket and the target mobile terminal based on a communicational connection between the vehicle bracket and the target mobile terminal in a case that it is determined that the target mobile terminal is fixed on the vehicle bracket.

In an embodiment, the step 10b may be performed by: determining, in a case that a magnetic field sensor arranged on the vehicle bracket detects that intensity of a magnetic field of a mobile terminal is gradually increasing to a certain extent, the mobile terminal as the target mobile terminal.

In another embodiment, the step 10b may be performed by: determining at least one candidate mobile terminal based on the change in the intensity of the magnetic field between the at least one mobile terminal and the vehicle bracket detected by the magnetic field sensor, where intensity of a magnetic field between the at least one candidate mobile terminal and the vehicle bracket is greater than a third magnetic field intensity threshold; detecting, by using a distance sensor arranged on the vehicle bracket, a distance between the at least one candidate mobile terminal and the vehicle bracket; selecting a mobile terminal having a distance from the vehicle bracket less than a predetermined distance threshold from the at least one candidate mobile terminal as the target mobile terminal. The third magnetic field intensity threshold is different from a first magnetic field intensity threshold and a second magnetic field intensity threshold which are mentioned below. The third magnetic field intensity threshold is less than the first magnetic field intensity threshold or the second magnetic field intensity threshold. In the embodiments of the present disclosure, the range of the distance threshold may be set flexibly based on different application scenarios and performance indicators of the distance sensor. For example, the predetermined distance threshold may be, but is not limited to, less than or equal to 2 cm. The first magnetic field intensity threshold, the second magnetic field intensity threshold and the third magnetic field intensity threshold are not limited in the embodiment and may be flexibly set according to application requirements.

In the above embodiments, the target mobile terminal is determined based on the change in the intensity of the magnetic field between the mobile terminal and the vehicle bracket and the change in the distance between the mobile terminal and the vehicle bracket, improving the accuracy of determining the target mobile terminal, reducing the probability of performing screen delivery with a wrong mobile terminal, and thereby improving the probability of successful screen delivery.

According to the step 103 or 10c in the embodiments of the present disclosure, screen delivery may be performed between the vehicle bracket and the target mobile terminal. In some application scenarios, the content displayed on the screen of the vehicle bracket may be transferred to the target mobile terminal for display. In other application scenarios, the content displayed on the screen of the target mobile terminal may be transferred to the vehicle bracket for display on the screen of the vehicle bracket. Detail descriptions are provided below based on some exemplary application scenarios.

In an application scenario A, in order not to obstruct the sight of the driver while driving, the size of the screen of the vehicle bracket is set small. In a case that a map or traffic condition information is displayed on the screen of the vehicle bracket to provide navigation information for the driver, it is inconvenient for the driver to view the route due to the small size of the screen of the vehicle bracket. Compared with the screen of the vehicle bracket, the screen of the mobile terminal is generally larger in size. Therefore, in an embodiment, the step 103 or 10c may be performed by: displaying, on the screen of the target mobile terminal, content displayed on the screen of the vehicle bracket based on the communicational connection in a case that it is determined that the target mobile terminal is fixed on the vehicle bracket. Thus, the driver may view the route on the large screen of the mobile terminal.

In an embodiment, based on the step 103 or 10c, in a case that it is determined that the target mobile terminal is fixed on the vehicle bracket, the vehicle bracket may send a screen wake-up instruction to the target mobile terminal based on the communicational connection between the vehicle bracket and the target mobile terminal to instruct the target mobile terminal to wake up the screen of the target mobile terminal. The vehicle bracket sends the content displayed on the screen of the vehicle bracket to the target mobile terminal to display, on the screen of the target mobile terminal, the content displayed on the screen of the vehicle bracket. The screen of the vehicle bracket may be controlled to enter into a dormant state to save power consumption.

In the application scenario A, after the navigation information displayed on the screen of the vehicle bracket is transferred to the target mobile terminal for display on the screen of the target mobile terminal, if a phone call arrives at the target mobile terminal, such as a mobile phone, the user generally picks up the mobile phone to answer the call, it is inconvenient to display the navigation information on the screen of the target mobile terminal. In order to avoid getting lost or taking a wrong intersection on the highway in a case that it is determined that the target mobile terminal is removed from the vehicle bracket, the vehicle bracket may wake up the screen of the vehicle bracket and display subsequent content on the screen of the vehicle bracket to end the screen delivery. Thus, the user may view the route on the screen of the vehicle bracket in time to avoid situations such as getting lost or taking a wrong way due to the inability to check the route in time.

In order to save power consumption, after it is determined that the target mobile terminal is removed from the vehicle bracket, the vehicle bracket may disconnect the communicational connection with the target mobile terminal and stop sending the content displayed on the screen of the vehicle bracket to the target mobile terminal.

In the application scenario A, after the navigation information displayed on the screen of the vehicle bracket is transferred to the target mobile terminal for display on the screen of the target mobile terminal, the vehicle bracket may detect the remaining power of the target mobile terminal. In a case that the vehicle bracket detects that the remaining power of the target mobile terminal is lower than a predetermined power threshold, the vehicle bracket may wake up the screen of the vehicle bracket and display subsequent content on the screen of the vehicle bracket to end the screen delivery. In an embodiment, the vehicle bracket may send a screen off instruction to the target mobile terminal to notify the target mobile terminal to enter into a dormant state. In response to the screen off instruction, the target mobile terminal turns off the screen of the target mobile terminal and enters into the dormant state.

In an embodiment, the vehicle bracket may be arranged with a wireless charging module. In a case of detecting that the remaining power of the target mobile terminal is lower than a predetermined power threshold, the vehicle bracket may wirelessly charge the target mobile terminal. After the charging is completed, the vehicle bracket stops charging the target mobile terminal.

In an application scenario B, on the way of driving a current passenger to a destination, the taxi driver generally pays attention to whether a taxi-hailing software installed on the mobile terminal prompts a piece of order information from a next passenger while viewing the navigation information on the mobile terminal, so as to grab an order timely. Thus, the taxi driver uses the same mobile terminal to view the route and grab orders simultaneously. Thus, in a case that the mobile terminal of the taxi driver is fixed on the vehicle bracket, if the electronic map stored in the mobile terminal is transferred to the vehicle bracket for display on the screen of the vehicle bracket, the taxi driver can grab orders using the mobile terminal and view the route on the screen of the vehicle bracket. Therefore, in an embodiment, the step 103 or 10c may be performed by: displaying, on the screen of the vehicle bracket, content displayed on the screen of the target mobile terminal based on the communicational connection in a case that it is determined that the target mobile terminal is fixed on the vehicle bracket.

In an embodiment, in a case that it is determined that the target mobile terminal is fixed on the vehicle bracket, the vehicle bracket may send a screen delivery request instruction to the target mobile terminal to instruct the target mobile terminal to send the content displayed on the screen of the target mobile terminal to the vehicle bracket. In response to the screen delivery request instruction, the target mobile terminal sends the currently displayed content to the vehicle bracket for display by the vehicle bracket.

In addition, the target mobile terminal may operate the content displayed on reception of a screen delivery instruction in the background, send the content operated in the background to the vehicle bracket for display, and display, in response to a selecting operation of the user, content corresponding to the selecting operation of the user. For example, in the application scenario B, the target mobile terminal sends the electronic map displayed on reception of a screen delivery instruction to the vehicle bracket for display, operates the electronic map in the background, and sends the electronic map operated in the background to the vehicle bracket in real time, so that the driver may view the route in real time. The target mobile terminal may display information on the interface of the taxi-hailing software in response to an operation, such as a click operation, in the taxi-hailing software installed on the target mobile terminal, so that the driver may grab orders. In this way, the driver may pay attention to the order information while viewing the route without frequently switching the content displayed on the screen of the mobile terminal, thereby improving the user experience. In addition, that the driver frequently operates the mobile terminal affects driving safety. With the embodiment, driving safety can be improved.

It should be noted that in the application scenario B, in order to prevent the target mobile terminal and the screen of the vehicle bracket from obstructing each other after the target mobile terminal is fixed on the vehicle bracket, the position of the screen of the vehicle bracket relative to the region where the mobile terminal is fixed on the vehicle bracket may be set properly, so that the target mobile terminal and the screen of the vehicle bracket do not obstruct each other. For example, the screen of the vehicle bracket may be arranged at a side of the vehicle bracket or above the vehicle bracket. Furthermore, for ease of use, the screen of the vehicle bracket may be configured to have a structure with functions such as rotation and flipping.

In addition, it should be noted that, in the above two embodiments in which the step 103 or 10c is performed, screen delivery is performed in the case that it is determined that the target mobile terminal is fixed on the vehicle bracket. For the vehicle brackets implemented in different forms, that the target mobile terminal is fixed on the vehicle bracket or the target mobile terminal is removed from the vehicle bracket is determined in different ways. Several embodiments are described below.

In an embodiment a, the vehicle bracket may be arranged with a gravity sensor. In a case that the gravity sensor arranged on the vehicle bracket detects that the gravity of the vehicle bracket increases, it is determined that the target mobile terminal is fixed on the vehicle bracket.

In a case that the gravity sensor arranged on the vehicle bracket detects that the gravity of the vehicle bracket decreases, it is determined that the target mobile terminal is removed from the vehicle bracket.

In an embodiment b, the vehicle bracket may be arranged with a magnetic field sensor. In an embodiment, the magnetic field sensor may be, but is not limited to, a Hall switch sensor, a thin film magnetoresistive sensor, and a magnetoresistive sensor. In a case that the magnetic field sensor arranged on the vehicle bracket detects that the intensity of the magnetic field around the vehicle bracket exceeds a predetermined magnetic field intensity threshold, it is determined that the target mobile terminal is fixed on the vehicle bracket. In an embodiment, in a case that the magnetic field sensor arranged on the vehicle bracket detects that the intensity of the magnetic field around the vehicle bracket gradually increases and exceeds the predetermined magnetic field intensity threshold, it is determined that the target mobile terminal is fixed on the vehicle bracket. For ease of description and distinction, the predetermined magnetic field intensity threshold is defined as a first magnetic field intensity threshold. The first magnetic field intensity threshold may be flexibly configured based on the sensitivity of the magnetic field sensor and the magnetic capacity of the magnet for adsorbing the mobile terminal on the vehicle bracket.

In a case that the magnetic field sensor arranged on the vehicle bracket detects that the intensity of the magnetic field around the vehicle bracket gradually decreases and is lower than a predetermined fourth magnetic field intensity threshold, it is determined that the target mobile terminal is removed from the vehicle bracket In an embodiment c, the target mobile terminal may be arranged with a magnetic field sensor. In an embodiment, the magnetic field sensor may be, but is not limited to, a Hall switch sensor, a thin film magnetoresistive sensor, and a magnetoresistive sensor. In a case that the magnetic field sensor arranged in the target mobile terminal detects that the intensity of the magnetic field around the target mobile terminal exceeds a predetermined magnetic field intensity threshold, a first electric signal is sent. In an embodiment, in a case that the magnetic field sensor arranged in the target mobile terminal detects that the intensity of the magnetic field around the target mobile terminal increases and exceeds the predetermined magnetic field intensity threshold, the first electric signal is sent. The vehicle bracket, on reception of the first electric signal from the target mobile terminal, determines that the target mobile terminal is fixed on the vehicle bracket. The first electric signal is sent in a case that the magnetic field sensor arranged in the target mobile terminal detects that the intensity of the magnetic field around the target mobile terminal exceeds the predetermined magnetic field intensity threshold. For ease of description and distinction, the predetermined magnetic field intensity threshold is defined as a second magnetic field intensity threshold. The second magnetic field intensity threshold may be flexibly configured based on the sensitivity of the magnetic field sensor and the magnetic capacity of the magnet for adsorbing the mobile terminal on the vehicle bracket.

In a case that a second electric signal from the target mobile terminal is received, it is determined that the target mobile terminal is removed from the vehicle bracket. The second electric signal is sent in a case that the magnetic field sensor arranged in the target mobile terminal detects that the intensity of the magnetic field around the target mobile terminal gradually decreases and is lower than a predetermined fifth magnetic field intensity threshold.

It should be noted that the steps in the method according to the above embodiments may be performed by the same device or be performed by different devices. For example, the step 101 and the step 102 may be performed by a device A. For another example, the step 101 may be performed by the device A and the step 102 may be performed by a device B.

In addition, in some processes described in the above embodiments and shown in the drawings, multiple operations in a certain order are included. However, it should be understood that these operations may be performed out of the order in which these operations are described in the present disclosure or may be performed in parallel. The sequence numbers, such as 101 and 102, are only used for distinguishing different operations and do not represent any execution order. In addition, these processes may include more or fewer operations, and these operations may be performed sequentially or in parallel.

A readable storage medium storing a computer program is further provided according to an embodiment of the present disclosure. The computer program, when executed, may perform the screen delivery method.

Figure 1C:
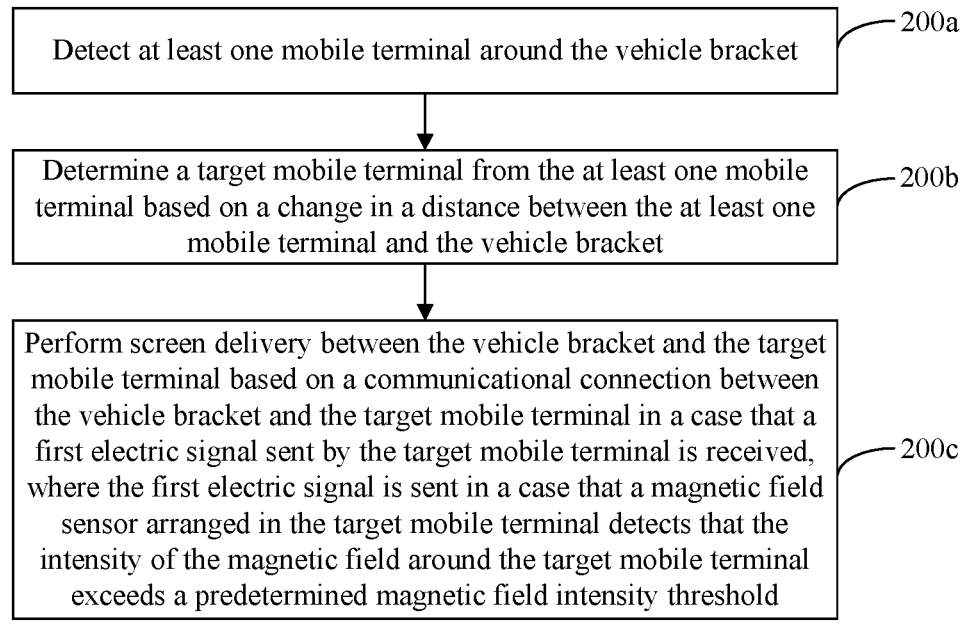
FIG. 1c is a flow chart of a screen delivery method according to another embodiment of the present disclosure.

In addition to the above method embodiments, a screen delivery method is further provided according to another embodiment of the present disclosure. As shown in FIG. 1c, the method includes the following steps 200a to 200c.

In step 200a, at least one mobile terminal around the vehicle bracket is detected.

In step 200b, a target mobile terminal is determined from the at least one mobile terminal based on a change in a distance between the at least one mobile terminal and the vehicle bracket.

In step 200c, in a case that a first electric signal sent by the target mobile terminal is received, screen delivery is performed between the vehicle bracket and the target mobile terminal based on a communicational connection between the vehicle bracket and the target mobile terminal. The first electric signal is sent in a case that a magnetic field sensor arranged in the target mobile terminal detects that the intensity of the magnetic field around the target mobile terminal exceeds a predetermined magnetic field intensity threshold.

In the embodiment, the vehicle bracket is arranged with a magnet, a display screen and a distance sensor. The target mobile terminal is arranged with a magnetic field sensor to detect a magnetic field intensity signal around the target mobile terminal. The magnetic field sensor arranged in the target mobile terminal may be a Hall switch sensor. Thus, the process of performing screen delivery between the vehicle bracket and the mobile terminal includes: detecting, by the vehicle bracket, at least one mobile terminal around the vehicle bracket. Depending on the vehicle where the vehicle bracket is located, there may be one mobile terminal or multiple mobile terminals around the vehicle bracket.

It should be noted that in a case that at least one mobile terminal is detected around the vehicle bracket, it does not mean that the vehicle must perform screen delivery with one or more mobile terminals in the at least one mobile terminal. Only in a case that a mobile terminal around the vehicle bracket needs to perform screen delivery with the vehicle bracket, screen delivery is performed between the vehicle bracket and the mobile terminal. Generally, the mobile terminal that needs to perform screen delivery with the vehicle bracket is required to be fixed on the vehicle bracket. While the mobile terminal is fixed on the vehicle bracket, the mobile terminal that needs to perform screen delivery with the vehicle bracket is gradually approaching the vehicle bracket.

The vehicle bracket may detect the change in the distance between the at least one mobile terminal and the vehicle bracket by using a distance sensor arranged on the vehicle bracket, and then determines the target mobile terminal from the at least one mobile terminal based on the change in the distance between the at least one mobile terminal and the vehicle bracket. For example, it may be detected whether there is a mobile terminal gradually approaching the vehicle bracket in the at least one mobile terminal based on the change in the distance between the at least one mobile terminal and the vehicle bracket. If there is a mobile terminal gradually approaching the vehicle bracket in the at least one mobile terminal, a mobile terminal having a distance decreased to be within a predetermined distance threshold range from the vehicle bracket is selected from the mobile terminal gradually approaching the vehicle bracket as the target mobile terminal.

After the target mobile terminal is determined, the target mobile terminal gradually approaches the vehicle bracket and is finally fixed on the vehicle bracket. During the target mobile terminal gradually approaches the vehicle bracket, the intensity of the magnetic field between the target mobile terminal and the vehicle bracket gradually increases, and the change in the intensity of the magnetic field is detected by the magnetic field sensor arranged in the target mobile terminal. The target mobile terminal may send an electric signal if the magnetic field sensor arranged in the target mobile terminal detects that the intensity of the magnetic field around the target mobile terminal exceeds the predetermined magnetic field intensity threshold. On reception of the electric signal, the vehicle bracket determines that the target mobile terminal is fixed on the vehicle bracket and performs screen delivery with the target mobile terminal based on the communicational connection between the vehicle bracket and the target mobile terminal.

For further descriptions, one may refer to the above embodiments, which are not repeated herein.

Figure 2A:
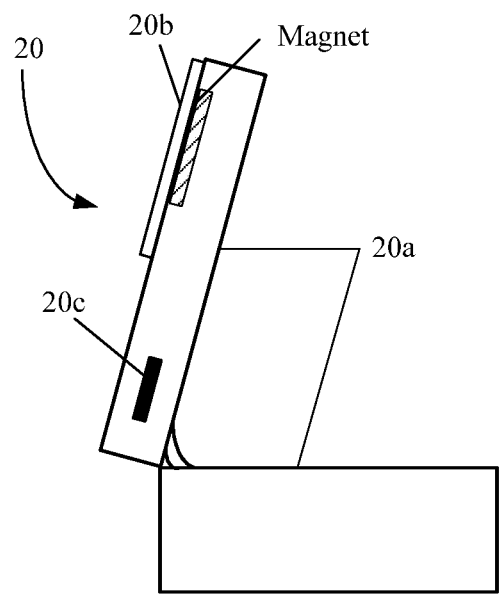
FIG. 2a is a schematic structural diagram of a vehicle bracket according to an embodiment of the present disclosure.

FIG. 2a is a schematic structural diagram of a vehicle bracket according to an embodiment of the present disclosure. As shown in FIG. 2a, a vehicle bracket 200 includes a bracket body 20a. The bracket body 20a is arranged with a screen 20b and a processor 20c.

The processor 20c is configured to: detect at least one mobile terminal around the vehicle bracket 20, determine a target mobile terminal from the at least one terminal based on proximity of the at least one mobile terminal to the vehicle bracket 20, and perform screen delivery between the vehicle bracket 20 and the target mobile terminal based on a communicational connection between the vehicle bracket 20 and the target mobile terminal.

Figure 2B:
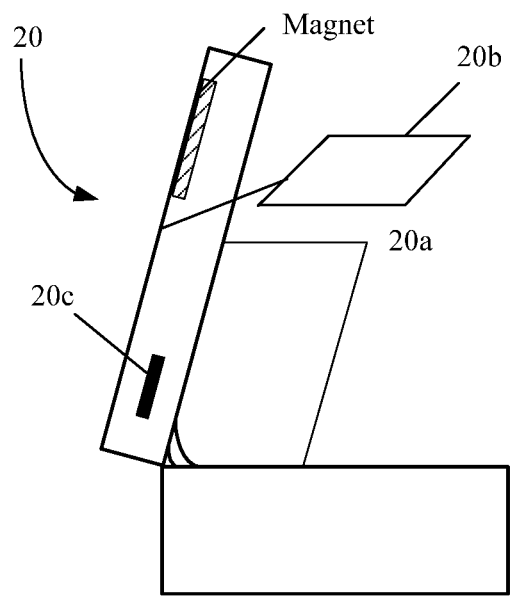
FIG. 2b is a schematic structural diagram of a vehicle bracket according to another embodiment of the present disclosure.

In an embodiment, referring to FIG. 2b in which a schematic diagram of a structure in the vehicle bracket 20 is shown, the vehicle bracket 20 further includes a communication component 20d. The communication component 20d may be configured to establish a wireless communication between the vehicle bracket 20 and the target mobile terminal. In an exemplary embodiment, the communication component 20d further includes a near field communication (NFC) module to facilitate a short-range communication. The NFC module may be implemented based on, for example, the radio frequency identification (RFID) technology, the infrared data association (IrDA) technology, the ultra-wideband (UWB) technology, and the Bluetooth (BT) technology.

Due to the different implementation of the communication component 20d, the communication modes supported by the vehicle bracket 20 are different. Based on the communication mode supported by the vehicle bracket 20, the processor 20c, in detecting at least one mobile terminal around the vehicle bracket, is configured to detect, within an effective distance range for a communication mode supported by the vehicle bracket 20, at least one mobile terminal that enables the communication mode, and establish a communicational connection with the mobile terminal around the vehicle bracket 200.

In an embodiment, the vehicle bracket 20 is arranged with a proximity sensor (not shown in FIG. 2a and FIG. 2b), such as a distance sensor, a magnetic field sensor, and a radio frequency signal strength detection module, to detect the proximity of the at least one mobile terminal to the vehicle bracket 20. In a case that the proximity sensor is a distance sensor, the processor 20c, in determining a target mobile terminal from the at least one mobile terminal based on the proximity of the at least one mobile terminal to the vehicle bracket 20, is configured to: detect, based on the distance between the at least one mobile terminal and the vehicle bracket 20, whether there is a mobile terminal gradually approaching the vehicle bracket 20 in the at least one mobile terminal, and select, in a case that there is a mobile terminal gradually approaching the vehicle bracket 20 in the at least one mobile terminal, a mobile terminal having a distance from the vehicle bracket 20 decreased to be within a predetermined distance threshold from the mobile terminal gradually approaching the vehicle bracket 20 as the target mobile terminal.

In an embodiment, the bracket body 20a is magnetic. For example, the bracket body 20a is arranged with a magnet. The proximity sensor arranged on the bracket body 20a may be configured as a magnetic field sensor to detect a change in a magnetic field between the bracket body 20a and a mobile terminal around the bracket body 20a. The processor 20c is configured to: detect at least one mobile terminal around the vehicle bracket 20; determine a target mobile terminal from the at least one mobile terminal based on a change in intensity of the magnetic field between the at least one mobile terminal and the vehicle bracket 20 detected by the magnetic field sensor; and perform, in a case that it is determined that the target mobile terminal is fixed on the bracket body 20a of the vehicle bracket 20, screen delivery between the vehicle bracket 20 and the target mobile terminal based on the communicational connection between the vehicle bracket 20 and the target mobile terminal.

In an embodiment, the processor 20c, in determining a target mobile terminal from the at least one mobile terminal based on the change in the intensity of the magnetic field between the at least one mobile terminal and the vehicle bracket 20, is configured to: determine, based on the change in the intensity of the magnetic field between the at least one mobile terminal and the vehicle bracket 20 detected by the magnetic field sensor, at least one candidate mobile terminal where intensity of a magnetic field between the at least one candidate mobile terminal and the vehicle bracket 20 is greater than a third magnetic field intensity threshold; detect a distance between the at least one candidate mobile terminal and the vehicle bracket 20 by using the distance sensor arranged on the bracket body 20a; and select a mobile terminal having a distance from the vehicle bracket 20 less than a predetermined distance threshold from the at least one candidate mobile terminal as the target mobile terminal. In an embodiment, the predetermined distance threshold may be, but is not limited to, less than or equal to 2 cm.

In an embodiment, the vehicle bracket 20 may further be arranged with a contact sensor (not shown in FIG. 2a and FIG. 2b) to detect whether the target mobile terminal is fixed on the vehicle bracket 20. The contact sensor may be a gravity sensor to detect a change in gravity of the vehicle bracket 20. The processor 20c may be configured to: determine, in a case that the gravity sensor detects that the gravity of the vehicle bracket 20 increases, that the target mobile terminal is fixed on the vehicle bracket 20; and determine, in a case that the gravity sensor detects that the gravity of the vehicle bracket 20 decreases, that the target mobile terminal is removed from the vehicle bracket 20.

Alternatively, the contact sensor may be a magnetic field sensor to detect a change in a magnetic field around the vehicle bracket 20. The processor 20c may be configured to: determine, in a case that the magnetic field sensor detects that the intensity of the magnetic field around the vehicle bracket 20 exceeds a first magnetic field intensity threshold, that the target mobile terminal is fixed on the vehicle bracket 20. In an embodiment, the magnetic field sensor may be, but is not limited to, a Hall switch sensor, a thin film magnetoresistive sensor, and a magnetoresistive sensor.

It should be noted that the vehicle bracket 20 may attract the target mobile terminal with the magnetism of the vehicle bracket 20 and fix the target mobile terminal on the vehicle bracket 20.

The processor 20c is further configured to determine, in a case that the magnetic field sensor detects that the intensity of the magnetic field around the vehicle bracket 20 is lower than a fourth magnetic field intensity threshold, that the target mobile terminal is removed from the vehicle bracket 20.

Alternatively, the magnetic field sensor may be arranged on the target mobile terminal. A first electric signal is sent in a case that the magnetic field sensor arranged in the target mobile terminal detects that the intensity of the magnetic field around the target mobile terminal exceeds a second magnetic field intensity threshold. In an embodiment, the magnetic field sensor may be, but is not limited to, a Hall switch sensor, a thin film magnetoresistive sensor, and a magnetoresistive sensor. The processor 20c is configured to determine, in a case that the communication component 20d receives the first electric signal from the target mobile terminal, that the target mobile terminal is fixed on the vehicle bracket 20.

A second electric signal is sent in a case that the magnetic field sensor arranged in the target mobile terminal detects that the intensity of the magnetic field around the target mobile terminal gradually decreases to less than a fifth magnetic field intensity threshold. The processor 20c is configured to determine, in a case that the communication component 20d receives the second electric signal from the target mobile terminal, that the target mobile terminal is removed from the vehicle bracket 20.

Based on the application scenario A and the application scenario B in the above embodiments, the processor 20c, in performing screen delivery between the vehicle bracket 20 and the target mobile terminal, is configured to: display content displayed on the screen 20b of the vehicle bracket 20 on the screen of the target mobile terminal based on the communicational connection between the target mobile terminal and the vehicle bracket 20 in a case that it is determined that the target mobile terminal is fixed on the vehicle bracket 20; or in a case that it is determined that the target mobile terminal is fixed on the vehicle bracket 20, receive content displayed on the screen of the target mobile terminal from the target mobile terminal based on the communicational connection between the target mobile terminal and the vehicle bracket 20 and display, on the screen 20b of the vehicle bracket 20, the content displayed on the screen of the target mobile terminal.

It should be noted that in the application scenario B, in order to prevent the target mobile terminal and the screen of the vehicle bracket from obstructing each other after the target mobile terminal is fixed on the vehicle bracket, the position of the screen of the vehicle bracket relative to the region where the mobile terminal is fixed on the vehicle bracket may be set properly, so that the target mobile terminal and the screen of the vehicle bracket do not obstruct each other. For example, the screen of the vehicle bracket may be arranged at a side of the vehicle bracket or above the vehicle bracket. Furthermore, for ease of use, the screen of the vehicle bracket may be configured to have a structure with functions such as rotation and flipping. For example, as shown in FIG. 2b, the screen 20b of the vehicle bracket 20 is arranged on the bracket body 20a by using a fixed bracket.

The processor 20c, in displaying, on the screen of the target mobile terminal, the content displayed on the screen of the vehicle bracket 20 based on the communicational connection between the target mobile terminal and the vehicle bracket 20, is configured to: send a screen wake-up instruction to the target mobile terminal based on the communicational connection between the target mobile terminal and the vehicle bracket 20 to instruct the target mobile terminal to wake up the screen of the target mobile terminal; send the content displayed on the screen 20b of the vehicle bracket 20 to the target mobile terminal to display the content on the screen of the target mobile terminal; and control the screen 20b of the vehicle bracket 20 to enter into a dormant state.

The processor 20c is further configured to, in a case that it is determined that the target mobile terminal is removed from the vehicle bracket 20, wake up the screen 20b of the vehicle bracket 20 and display subsequent content on the screen 20b of the vehicle bracket 20 to end the screen delivery.

Figure 2C:
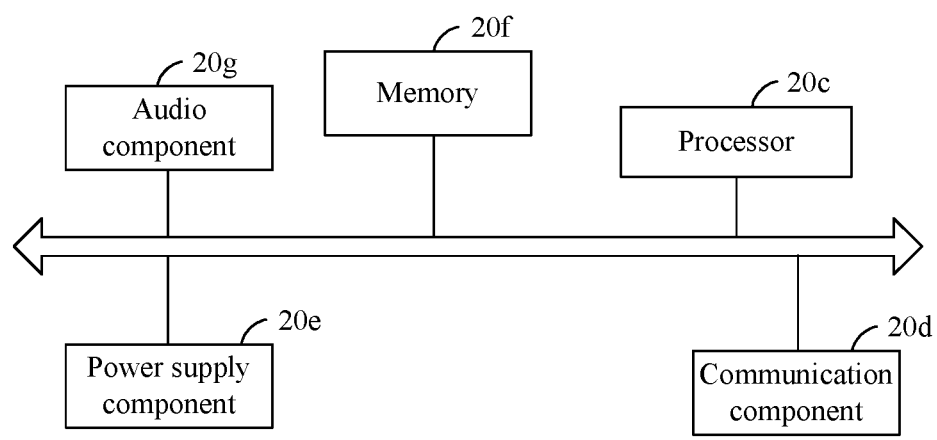
FIG. 2c is a schematic diagram of a structure in a vehicle bracket according to an embodiment of the present disclosure.

In an embodiment, as shown in FIG. 2c, the vehicle bracket 20 may further include a power supply component 20e. The power supply component 20e is configured to supply power to the components of the vehicle bracket 20. The power supply component 20e may include a power supply management system, one or more power supplies, and other components associated with generating, managing and distributing power for the device where the power supply component is located. In an embodiment, the power supply component 20*e* may further include a wireless charging module for charging the target mobile terminal wirelessly. The wireless charging module includes, but is not limited to, a wireless charging coil, a charging board and a receiver.

The power supply component 20*e* may further include a power detection unit. The power detection unit is configured to detect the power of the target mobile terminal. The processor 20*c*, in a case that the power detection unit detects that the power of the target mobile terminal is lower than a predetermined power threshold, is configured to control the wireless charging module to charge the target mobile terminal, and control, in a case that the power detection unit detects that the target mobile terminal is fully charged, the wireless charging module to stop charging the target mobile terminal.

In some embodiments, as shown in FIG. 2*c*, the vehicle bracket 20 may further include an optional component, such as a memory 20*f* and an audio component 20*g*. FIGS. 2*a* to 2*c* only schematically show some of the components, which does not mean that the vehicle bracket 20 must include all the components shown in FIGS. 2*a* to 2*c* and does not mean that the vehicle bracket only includes the components shown in FIGS. 2*a* to 2*c*.

The memory 20*f* is configured to store a computer program, and may be configured to store various data to support operations performed on the vehicle bracket 20. The processor 20*c* may execute the computer program stored in the memory 20*f* to perform control logic corresponding to the computer program. The memory 20*f* may be implemented by any type of volatile of non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The audio component 20*g* may be configured to output and/or input an audio signal. For example, the audio component includes a microphone (MIC). In a case that a device in which the audio component is arranged is in an operation mode, such as a call mode, a recording mode and a voice recognition mode, the microphone is configured to receive an external audio signal. The received audio signal may be stored in the memory or may be sent via the communication component 20*d*. In some embodiments, the audio component further includes a speaker for outputting an audio signal. For example, an intelligent mirror with a language interaction function may perform voice interaction with a user by using the audio component 20*g*.

It should be noted that, the shape of the vehicle bracket 20 and the positions of the screen, the processor, the magnet, the memory, the communication component, the power supply component and the audio component arranged on the vehicle bracket 20 shown in FIGS. 2*a* to 2*c* are illustrative, which are not limited. In addition to the components shown in FIGS. 2*a* to 2*c*, the vehicle bracket 20 may further includes a component for fixing the target mobile terminal according to the application requirements, which is not shown in FIGS. 2*a* to 2*c*. The mobile terminal may be fixed on the vehicle bracket 20 in various forms according to the embodiments of the present disclosure, and the vehicle bracket 20 may be arranged with a fixing component corresponding to the forms. For example, a suction cup may be arranged to attract and fix the mobile terminal. For another example, a strong magnet may be arranged to attract the mobile terminal with strong magnetism and fix the mobile terminal. For another example, a buckle or a clip may be arranged to mechanically fix the mobile terminal.

In addition to the vehicle bracket according to the above embodiments, a vehicle bracket is provided according to another embodiment of the present disclosure. The vehicle bracket includes a bracket body. The bracket body is arranged with a magnet, a distance sensor, a screen and a processor.

The distance sensor is configured to detect a change in a distance between the vehicle bracket and a mobile terminal around the vehicle bracket.

The processor is configured to: detect at least one mobile terminal around the vehicle bracket; determine, based on a change in a distance between the at least one mobile terminal and the vehicle bracket detected by the distance sensor, a target mobile terminal from the at least one mobile terminal; and perform, in a case that an electric signal sent by the target mobile terminal is received, screen delivery between the vehicle bracket and the target mobile terminal based on a communicational connection between the vehicle bracket and the target mobile terminal. The electric signal is sent in a case that a magnetic field sensor arranged in the target mobile terminal detects that intensity of a magnetic field around the target mobile terminal exceeds a predetermined magnetic field intensity threshold.

In an embodiment, the processor, in performing screen delivery between the vehicle bracket and the target mobile terminal, is configured to: display, on a screen of the target mobile terminal, content displayed on a screen of the vehicle bracket based on the communicational connection between the target mobile terminal and the vehicle bracket; or receive content displayed on a screen of the target mobile terminal from the target mobile terminal based on the communicational connection between the target mobile terminal and the vehicle bracket, and display, on a screen of the vehicle bracket, the content displayed on the screen of the target mobile terminal.

The processor, in displaying, on the screen of the target mobile terminal, the content displayed on the screen of the vehicle bracket based on the communicational connection between the target mobile terminal and the vehicle bracket, is further configured to: send a screen wake-up instruction to the target mobile terminal based on the communicational connection between the target mobile terminal and the vehicle bracket to instruct the target mobile terminal to wake up the screen of the target mobile terminal; send the content displayed on the screen of the vehicle bracket to the target mobile terminal to display the content on the screen of the target mobile terminal; and control the screen of the vehicle bracket to enter into a dormant state.

The processor, in a case that it is determined that the target mobile terminal is removed from the vehicle bracket, is further configured to wake up the screen of the vehicle bracket and display subsequent content on the screen of the vehicle bracket to end the screen delivery.

In an embodiment, the vehicle bracket may further include a power supply component. The power supply component is configured to supply power to the components of the vehicle bracket. The power supply component may include a power supply management system, one or more power supplies, and other components associated with generating, managing and distributing power for the device where the power supply component is located. In an embodiment, the power supply component may further include a wireless charging module for charging the target mobile terminal wirelessly. The wireless charging module includes, but is not limited to, a wireless charging coil, a charging board and a receiver.

It should be noted that the descriptions such as "first" and "second" in the present disclosure are used to distinguish different messages, devices, and modules, rather than to represent a sequence or to limit that the "first" and the "second" are different types.

It should be understood by those skilled in the art that a method, a system or a computer program product may be provided according to the embodiments of the present disclosure. Therefore, the present disclosure may be in the form of full hardware embodiments, full software embodiments, or a combination thereof. In addition, the present disclosure may be in a form of a computer program product that is implemented on one or more computer-usable storage medium (including but not limited to a disk memory, a CD-ROM, and an optical memory) storing computer-usable program codes.

The present disclosure is described with reference to flowcharts and/or block diagrams of the method, the device (system) and the computer program product according to the embodiments of the present disclosure. It should be understood that each process and/or each block in the flowcharts and/or the block diagrams, and a combination of processes and/or blocks in the flowcharts and/or the block diagrams can be realized by computer program instructions. The computer program instructions may be provided to a processor of a general-purpose computer, a special-purpose computer, an embedded processor or other programmable data processing devices to generate a machine, so that the instructions executed by the processor of the computer or other programmable data processing devices to generate a device for realizing the functions specified in one or more processes in the flowcharts and/or in one or more blocks in the block diagrams.

The computer program instructions may be stored in a computer readable memory that can guide a computer or other programmable data processing devices to operate in a specific manner, so that the instructions stored in the computer readable memory produce a product including an instruction device. The instruction device realizes the functions specified in one or more processes in the flowcharts and/or specified in one or more blocks in the block diagrams.

The computer program instructions may be loaded on a computer or other programmable data processing devices to cause the computer or other programmable devices to perform a series of operations to produce computer-implemented processing. Thus, the instructions executed by the computer or other programmable devices realize the functions specified in one or more processes in the flowcharts and/or the functions specified in one or more blocks in the block diagrams.

In a typical configuration, a computing device includes one or more processors (CPU), an input/output interface, a network interface and a memory.

The memory may be a non-permanent memory in a computer readable medium, a random access memory (RAM) and/or a non-volatile memory, such as a read only memory (ROM) or a flash memory (flash RAM). The memory is an example of the computer readable medium.

The computer readable storage medium may be a permanent medium or a non-permanent c medium, a removable medium or a non-removable medium. The computer readable storage medium may store information with any method or technology. The information may be computer readable instructions, data structures, program modules, or other data. The computer storage medium includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read only memory (CD-ROM), a digital versatile disk (DVD) or other optical memories, a magnetic cassettes, a magnetic tape and magnetic disk storage, other magnetic storage devices, or any other non-transmission medium capable of storing information that can be accessed by a computing device. According to the present disclosure, the computer readable medium does not include a transitory media, such as a modulated data signal and a carrier.

It should be noted that terms of "include", "comprise" or any other variants are intended to be non-exclusive. Therefore, a process, a method, an article or a device including multiple elements includes not only the elements but also other elements that are not enumerated, or also includes the elements inherent for the process, the method, the article or the device. Unless expressively limited otherwise, the statement "comprising (including) one . . . " does not exclude the case that other similar elements may exist in the process, the method, the article or the device.

The foregoing are merely embodiments of the present disclosure and are not intended to limit the present disclosure. For those skilled in the art, various modifications and variations may be made to the present disclosure. Any modifications, equivalent substitutions and improvements made within the spirit and the principle of the present disclosure should fall within the scope of protection of the claims.

The invention claimed is:

1. A screen delivery method, applied to a vehicle bracket, wherein the method comprises:
   detecting at least one mobile terminal around the vehicle bracket;
   determining a target mobile terminal from the at least one mobile terminal based on a change in intensity of a magnetic field between the at least one mobile terminal and the vehicle bracket; and
   performing screen delivery between the vehicle bracket and the target mobile terminal based on a communicational connection between the vehicle bracket and the target mobile terminal in a case that it is determined that the target mobile terminal is fixed on the vehicle bracket, wherein the performing screen delivery between the vehicle bracket and the target mobile terminal based on the communicational connection between the vehicle bracket and the target mobile terminal comprises:
      sending a screen wake-up instruction to the target mobile terminal based on the communicational connection to instruct the target mobile terminal to wake up a screen of the target mobile terminal;
      sending content displayed on a screen of the vehicle bracket to the target mobile terminal to display the content on the screen of the target mobile terminal; and
      controlling the screen of the vehicle bracket to enter into a dormant state.

2. The method according to claim 1, wherein the performing screen delivery between the vehicle bracket and the target mobile terminal based on the communicational connection between the vehicle bracket and the target mobile terminal comprises:
- displaying, on a screen of the target mobile terminal, content displayed on a screen of the vehicle bracket based on the communicational connection; or
- displaying, on a screen of the vehicle bracket, content displayed on a screen of the target mobile terminal based on the communicational connection.

3. The method according to claim 2, wherein the displaying, on the screen of the target mobile terminal, content displayed on the screen of the vehicle bracket based on the communicational connection comprises:
- sending a screen wake-up instruction to the target mobile terminal based on the communicational connection to instruct the target mobile terminal to wake up the screen of the target mobile terminal;
- sending the content displayed on the screen of the vehicle bracket to the target mobile terminal to display the content on the screen of the target mobile terminal; and
- controlling the screen of the vehicle bracket to enter into a dormant state.

4. The method according to claim 3, wherein the determining the target mobile terminal from the at least one mobile terminal based on the change in intensity of a magnetic field between the at least mobile terminal and the vehicle bracket comprises:
- determining at least one candidate mobile terminal based on the change in the intensity of the magnetic field between the at least one mobile terminal and the vehicle bracket, wherein intensity of a magnetic field between the at least one candidate mobile terminal and the vehicle bracket is greater than a third magnetic field intensity threshold;
- detecting a distance between the at least one candidate mobile terminal and the vehicle bracket; and
- selecting a mobile terminal having a distance from the vehicle bracket less than a predetermined distance threshold from the at least one candidate mobile terminal as the target mobile terminal.

5. The method according to claim 2, wherein the determining the target mobile terminal from the at least one mobile terminal based on the change in intensity of a magnetic field between the at least one mobile terminal and the vehicle bracket comprises:
- determining at least one candidate mobile terminal based on the change in the intensity of the magnetic field between the at least one mobile terminal and the vehicle bracket, wherein intensity of a magnetic field between the at least one candidate mobile terminal and the vehicle bracket is greater than a third magnetic field intensity threshold;
- detecting a distance between the at least one candidate mobile terminal and the vehicle bracket; and
- selecting a mobile terminal having a distance from the vehicle bracket less than a predetermined distance threshold from the at least one candidate mobile terminal as the target mobile terminal.

6. The method according to claim 1, wherein that the target mobile terminal is fixed on the vehicle bracket is determined by:
- determining, in a case that a gravity sensor in the vehicle bracket detects that gravity of the vehicle bracket increases, that the target mobile terminal is fixed on the vehicle bracket; or
- determining, in a case that a magnetic field sensor in the vehicle bracket detects that intensity of a magnetic field around the vehicle bracket exceeds a first magnetic field intensity threshold, that the target mobile terminal is fixed on the vehicle bracket; or
- determining, in a case that a first electric signal sent by the target mobile terminal is received, that the target mobile terminal is fixed on the vehicle bracket, wherein the first electric signal is sent in a case that a magnetic field sensor in the target mobile terminal detects that intensity of a magnetic field around the target mobile terminal exceeds a second magnetic field intensity threshold.

7. The method according to claim 6, wherein the determining the target mobile terminal from the at least one mobile terminal based on the change in intensity of a magnetic field between the at least one mobile terminal and the vehicle bracket comprises:
- determining at least one candidate mobile terminal based on the change in the intensity of the magnetic field between the at least one mobile terminal and the vehicle bracket, wherein intensity of a magnetic field between the at least one candidate mobile terminal and the vehicle bracket is greater than a third magnetic field intensity threshold;
- detecting a distance between the at least one candidate mobile terminal and the vehicle bracket; and
- selecting a mobile terminal having a distance from the vehicle bracket less than a predetermined distance threshold from the at least one candidate mobile terminal as the target mobile terminal.

8. The method according to claim 1, further comprising:
- waking up the screen of the vehicle bracket and displaying subsequent content on the screen of the vehicle bracket to end the screen delivery in a case that it is determined that the target mobile terminal is removed from the vehicle bracket.

9. The method according to claim 8, wherein the determining the target mobile terminal from the at least one mobile terminal based on the change in intensity of a magnetic field between the at least one mobile terminal and the vehicle bracket comprises:
- determining at least one candidate mobile terminal based on the change in the intensity of the magnetic field between the at least one mobile terminal and the vehicle bracket, wherein intensity of a magnetic field between the at least one candidate mobile terminal and the vehicle bracket is greater than a third magnetic field intensity threshold;
- detecting a distance between the at least one candidate mobile terminal and the vehicle bracket; and
- selecting a mobile terminal having a distance from the vehicle bracket less than a predetermined distance threshold from the at least one candidate mobile terminal as the target mobile terminal.

10. The method according to claim 1, wherein the determining the target mobile terminal from the at least one mobile terminal based on the change in intensity of a magnetic field between the at least one mobile terminal and the vehicle bracket comprises:
- determining at least one candidate mobile terminal based on the change in the intensity of the magnetic field between the at least one mobile terminal and the vehicle bracket, wherein intensity of a magnetic field between the at least one candidate mobile terminal and the vehicle bracket is greater than a third magnetic field intensity threshold;
- detecting a distance between the at least one candidate mobile terminal and the vehicle bracket; and selecting a mobile terminal having a distance from the vehicle bracket less than a predetermined distance threshold from the at least one candidate mobile terminal as the target mobile terminal.

11. A readable storage medium storing a computer program, wherein the computer program, when executed, performs the screen delivery method according to claim 1.

12. A vehicle bracket, comprising a bracket body, wherein the bracket body is magnetic, and the bracket body is arranged with a magnetic field sensor, a screen and a processor, wherein:

the processor is configured to: detect at least one mobile terminal around the vehicle bracket; determine a target mobile terminal from the at least one mobile terminal based on a change in intensity of a magnetic field between the at least one mobile terminal and the vehicle bracket detected by the magnetic field sensor; and perform screen delivery between the vehicle bracket and the target mobile terminal based on a communicational connection between the vehicle bracket and the target mobile terminal in a case that it is determined that the target mobile terminal is fixed on the vehicle bracket; and the magnetic field sensor is configured to detect the change in the intensity of the magnetic field between the at least one mobile terminal and the vehicle bracket, wherein the bracket body is arranged with a distance sensor, and the processor, in determining the target mobile terminal from the at least one mobile terminal, is configured to:

determine at least one candidate mobile terminal based on the change in the intensity of the magnetic field between the at least one mobile terminal and the vehicle bracket, wherein intensity of a magnetic field between the at least one candidate mobile terminal and the vehicle bracket is greater than a third magnetic field intensity threshold;

detect a distance between the at least one candidate mobile terminal and the vehicle bracket by using the distance sensor; and select a mobile terminal having a distance from the vehicle bracket less than a predetermined distance threshold from the at least one candidate mobile terminal as the target mobile terminal, wherein the bracket body is arranged with a gravity sensor or a communication component, wherein the gravity sensor is configured to detect a change in gravity of the vehicle bracket, wherein the processor is configured to:

determine, in a case that the gravity sensor detects that the gravity of the vehicle bracket increases, that the target mobile terminal is fixed on the vehicle bracket; or determine, in a case that the magnetic field sensor detects that intensity of a magnetic field between the vehicle bracket and the target mobile terminal exceeds a first magnetic field intensity threshold, that the target mobile terminal is fixed on the vehicle bracket; or determine, in a case that the communication component receives a first electric signal from the target mobile terminal, that the target mobile terminal is fixed on the vehicle bracket, wherein the first electric signal is sent in a case that a magnetic field sensor in the target mobile terminal detects that intensity of a magnetic field around the target mobile terminal exceeds a second magnetic field intensity threshold.

\* \* \* \* \*